(No Model.)
J. S. STUART.
Dredge Winder.
No. 243,655. Patented June 28, 1881.
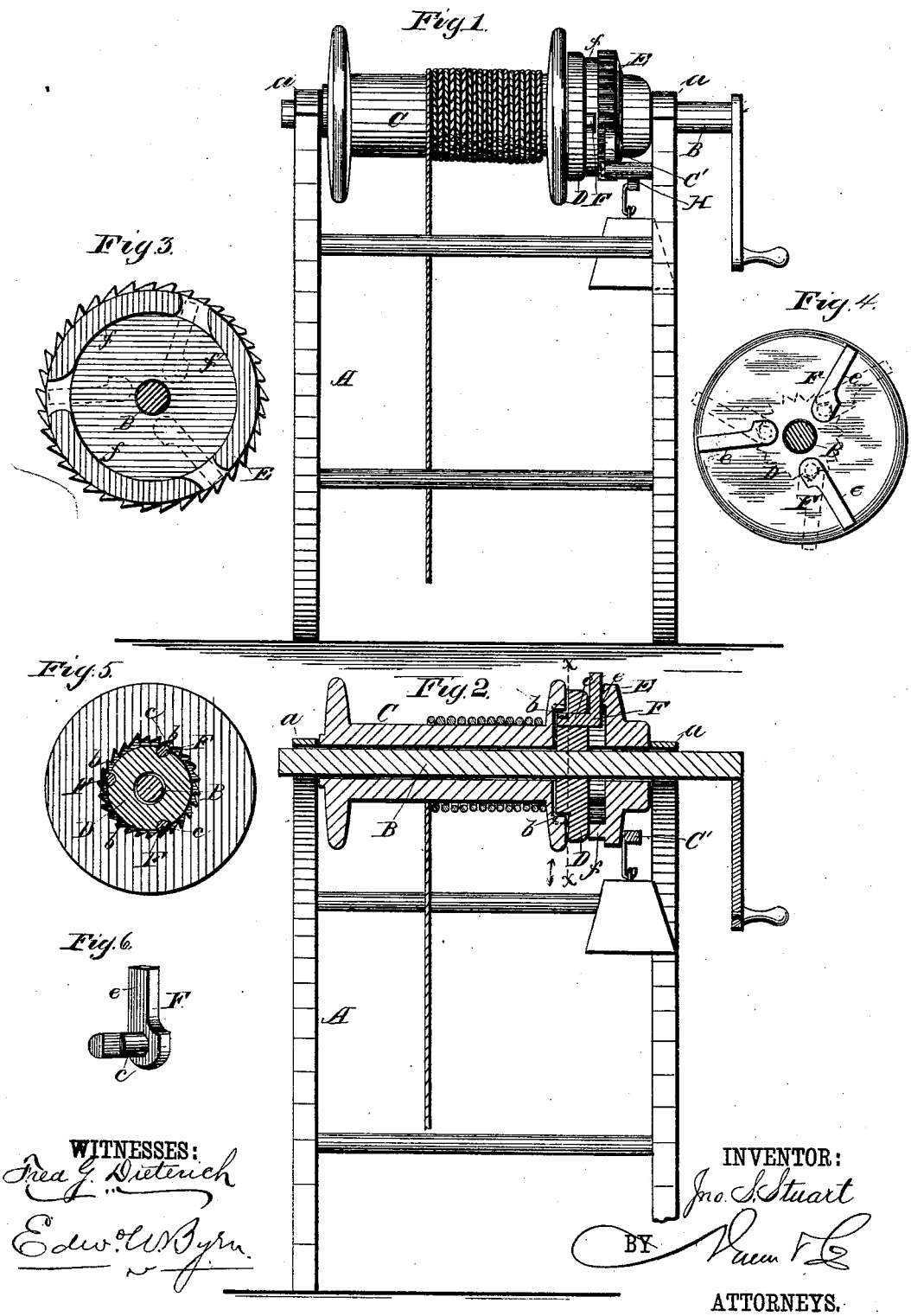
WITNESSES:
Fred G. Dieterich
Edw. W. Byrn
INVENTOR:
Jno. S. Stuart
BY
ATTORNEYS.

UNITED STATES PATENT OFFICE.

JOHN S. STUART, OF CRISFIELD, MARYLAND, ASSIGNOR TO HIMSELF AND EDWARD C. GUNBY, OF SAME PLACE.

DREDGE-WINDER.

SPECIFICATION forming part of Letters Patent No. 243,655, dated June 28, 1881.

Application filed May 12, 1881. (No model.)

*To all whom it may concern:*

Be it known that I, JOHN S. STUART, of Crisfield, in the county of Somerset and State of Maryland, have invented a new and useful Improvement in Dredge-Winders; and I do hereby declare that the following is a full, clear, and exact description of the same, reference being had to the accompanying drawings, forming part of this specification, in which—

Figure 1 is a front elevation. Fig. 2 is a vertical central longitudinal section. Fig. 3 is an inside face view of the loose ratchet-wheel. Fig. 4 is a view of the outer face of the rigid disk. Fig. 5 is a section through the line $xx$ of Fig. 2, looking in the direction of the arrow. Fig. 6 is a detail, in perspective, of one of the locking-dogs.

My invention relates to a novel construction of oyster-dredge winders.

In the business of taking oysters from the bottom of the river or bay the dredge is hauled along the bottom by a rope or lever attached to the vessel, whose movement through the water supplies the power to drag the dredge. Now, this business places the operators in great danger of life and limb, due to a violent backward motion of the crank in case the dredge should strike a "hang" or a large stone or other obstruction on the bed of the river or bay.

My invention is designed to provide a simple and efficient form of dredge-winders which shall obviate this danger; and for this purpose it consists in recessing the end of the spool and providing it with a circular series of inwardly-projecting ratchet-teeth, then fixing rigidly on the shaft at the end of the spool a disk, and outside of this a loose ratchet-wheel and pawl with right-angular dogs acting through the stationary disk from the loose ratchet-wheel upon the spool, so that the spool may be wound up or automatically released when an extraordinary strain is put upon the rope, as will be hereinafter more fully described.

In the drawings, A represents a frame-work, which may be of any approved form, and which carries in bearings $a\ a$ at the top the main shaft B. Upon this shaft is loosely arranged the spool C, upon which is wound the rope leading to the dredge. This spool is constructed with a circular recess about its center, in the edges of which recess is formed a circular series of inwardly-projecting ratchet-teeth, $b$, Fig. 5.

Upon the main shaft, just outside the recessed spool-head, is fixed a rigid disk, D, which is firmly connected to the shaft, so as to turn with it, and just outside of this is a ratchet-wheel, E. The disk D has in its face a circular boss or projection, which enters the recess of the spool, and at the periphery of this boss it has holes or bearings for one or more dogs, F, which bearings are parallel with the main shaft. These dogs are made with an axial portion, $c$, which turns in the bearings of the disk D, and whose ends, lying in the plane of the ratchet-teeth of the disk, are made angular, so as to enter said teeth when turned in one direction, and be withdrawn from said teeth when turned in the other direction. The other portions of these dogs $e$ are at right angles to the axial portion, and rest on the opposite side of the rigid disk from the spool, and are held in notches in a ring-shaped projection, $f$, on the inner side of the loose ratchet-wheel E, as shown in dotted line, Fig. 3. Upon this ratchet-wheel there rests a pawl or detent, C', to prevent back movement of the ratchet, and which pawl or detent is fulcrumed to the frame-work and provided with an elbow-extension, H, to which a weight is suspended, or for which a spring may be substituted to press the pawl against the teeth of said ratchet.

The action of this device is as follows: In winding up the dredge the main shaft is turned by a crank, or in any other suitable way, and the pressure of the pawl as it drags on the teeth of the loose ratchet-wheel E causes the latter to be strained slightly in a backward direction, which throws the arms $e$ of the dogs to the rear, or in an opposite direction to the movement, and which, by turning the parts $c$ of the dogs axially, throws their angular edges outward from the periphery of the boss on disk D, and into engagement with the ratchet-teeth of the spool, and as the shaft and disk D are rigidly connected, the dogs serve to connect them with the spool, and cause the latter to rotate to wind up the rope. If, however, an unusual strain suddenly comes upon the rope from the causes hereinbefore referred to, this strain is imparted to the disk D, and it and the shaft are momentarily started backward. Now, the ratchet-wheel E being held by its detent, it cannot move backward, and the slight initial movement of the shaft and disk D in backward direction throws the sections $e$ of the dogs into a more oblique position, as shown in dotted lines in Fig. 4, and by moving the other portions $c$ axially turns the tooth on each into the boss of disk D and out of engagement with the spool, and the latter is thereby released and allowed to unwind without giving anything more than a slight initial backward movement to the shaft. It will thus be seen that the rapid rotation of the shaft and crank is entirely avoided in a simple and practical manner.

Having thus described my invention, what I claim is—

1. A dredge-winder consisting of a rotary shaft, a loose spool arranged on said shaft and having an inwardly-projecting series of ratchet-teeth on the end, a rigid disk fixed upon the shaft, a loose ratchet-wheel arranged outside of this disk, and having a detent and a locking-dog arranged in the rigid disk and connected to the loose ratchet-wheel upon one side of said disk, and adapted to engage with the spool-ratchet on the other side, all combined substantially as shown and described.

2. The combination of the shaft B, recessed spool C, having ratchet-teeth $b$, rigid disk D, having a boss and bearings for the dogs, the dogs F, the loose ratchet-wheel E, with notched ring $f$, and the detent or pawl C′, substantially as and for the purpose described.

JOHN S. STUART.

Witnesses:
L. E. P. DENNIS,
D. W. MORGAN.